US008071176B2

(12) United States Patent
Hanrahan

(10) Patent No.: US 8,071,176 B2
(45) Date of Patent: Dec. 6, 2011

(54) PROCESS FOR FORMING A WEATHERABLE POLYVINYL CHLORIDE OR POLYOLEFIN ARTICLE

(75) Inventor: Kevin Hanrahan, Wayne, PA (US)

(73) Assignee: Arkema Inc., King of Prussia, PA (US)

( * ) Notice: Subject to any disclaimer, the term of this patent is extended or adjusted under 35 U.S.C. 154(b) by 1419 days.

(21) Appl. No.: 11/192,204

(22) Filed: Jul. 28, 2005

(65) Prior Publication Data

US 2006/0068131 A1     Mar. 30, 2006

Related U.S. Application Data

(60) Provisional application No. 60/612,678, filed on Sep. 24, 2004.

(51) Int. Cl.
    *B05D 7/02*     (2006.01)
    *B05D 1/02*     (2006.01)
    *B05D 1/28*     (2006.01)

(52) U.S. Cl. .......... 427/412.1; 427/412.3; 427/422; 427/424; 427/427.4; 427/427.6; 427/427.7; 427/428.01; 427/428.06; 427/429; 427/256; 347/171; 347/187

(58) Field of Classification Search .......... 427/412.1, 427/412.2, 412.3, 427/6, 428.01, 429, 421.1, 427/422, 424, 427.4, 427.7, 428.06, 256; 347/171, 187

See application file for complete search history.

(56) References Cited

U.S. PATENT DOCUMENTS

| | | | | |
|---|---|---|---|---|
| 3,519,531 | A | * | 7/1970 | James et al. ............ 428/516 |
| 4,556,589 | A | * | 12/1985 | Neumann et al. ........ 428/36.6 |
| 5,506,031 | A | | 4/1996 | Spain et al. |
| 5,555,006 | A | | 9/1996 | Cleveland et al. |
| 5,776,604 | A | * | 7/1998 | Lu et al. ................ 428/343 |
| 5,882,388 | A | | 3/1999 | Adair et al. |
| 5,972,514 | A | * | 10/1999 | D'Herbecourt et al. ... 428/424.6 |
| 2004/0191529 | A1 | | 9/2004 | Gillie |
| 2004/0197578 | A1 | * | 10/2004 | Sinsel et al. ............ 428/461 |
| 2004/0241395 | A1 | | 12/2004 | Jing et al. |

FOREIGN PATENT DOCUMENTS

| | | | | |
|---|---|---|---|---|
| CA | 2119966 | A1 | * | 9/1994 |
| DE | 25 57 292 | A1 | * | 6/1977 |
| EP | 0214790 | | | 3/1987 |
| JP | 55-084331 | A | | 6/1978 |
| JP | 55-061458 | A | * | 5/1980 |
| JP | 55-084331 | A | * | 6/1980 |
| JP | 58-057954 | A | * | 4/1983 |
| JP | 59-078247 | A | * | 5/1984 |
| JP | 61-171983 | A | * | 2/1986 |
| JP | 02304598 | | | 12/1990 |

\* cited by examiner

*Primary Examiner* — William Phillip Fletcher, III
(74) *Attorney, Agent, or Firm* — Thomas F. Roland

(57) ABSTRACT

This invention relates to a process for forming a PVC article having a weatherable coating by applying by in-line spray, roll-coat, brush-coat, gravure print, flexographic print, thermal transfer coat or inkjet a polymeric solution onto extruded PVC as it is being extruded. The invention also relates to rigid PVC articles coated by the process. A polyvinylidene fluoride coating can be applied to PVC to form an article having improved gloss, good weatherability, good color retention and stain resistance.

7 Claims, No Drawings

PROCESS FOR FORMING A WEATHERABLE POLYVINYL CHLORIDE OR POLYOLEFIN ARTICLE

This application claims benefit under U.S.C. §119(e) of U.S. provisional application 60/612,678, filed Sep. 24, 2004.

FIELD OF THE INVENTION

This invention relates to a process for forming an extruded article having a weatherable coating by the in-line spray, roll-coat, brush-coat, gravure print, flexographic print, thermal transfer coat or inkjet application of a polymeric solution onto an extruded thermoplastic substrate. The preferred substrates for which the process are PVC and polyolefins. The invention also relates to PVC and polyolefin articles coated by the process.

BACKGROUND OF THE INVENTION

Polyvinyl chloride (PVC) and polyolefin (PO) are economical thermoplastics that can be extruded into many useful articles. Unfortunately, PVC and polyolefin articles discolor, lose gloss, become chalky in appearance and embrittle if exposed to sunlight for extended periods of time. The discoloration and embrittlement is especially detrimental for articles intended for long-term weather exposure, such as house siding, window frames, rain systems, soffits, trim, pipe, panels, etc.

Many approaches have been used to improve the performance of the PVC and PO articles. Stabilizer systems such as lead stabilizers, calcium-zinc stabilizers, and the use of high levels of titanium dioxide pigment have be employed in the PVC resin.

An alternative method has been to employ a thin weatherable capstock over the PVC or PO substrate applied as a laminate or by co-extrusion. The capstock may be stabilized PVC, or a non-PVC polymer. Acrylics have been favored as capstocks for their color stability in outdoor exposure, however they are higher in cost. Film laminates of polyvinylidene difluoride have also been used. Several patents which describe the use of weatherable laminates for rigid PVC substrate compositions include EP 1061100; EP 0473379; U.S. Pat. Nos. 4,141,935; 4,169,180; 4,183,777; 5,306,548; and 5,976,671.

The problem with capstock and laminate processes is that they require a second piece of extrusion or laminating equipment that the throughput rates must be matched to account for differential cooling. Additionally, there is a significant loss of time and material wastage when the production line switches from one color to another. A further difficulty arises in the production/fabrication of dark colored PVC or PO articles, as the slower heat dissipation from the formed article causes production issues as well as occasional failure in the field (delamination, embrittlement, color loss, gloss loss, chalking).

U.S. Pat. No. 5,972,514 describes a means of coating a PVC substrate with a polymer coating using an air or airless spray, or an electrostatic process. The coating is then crosslinked by IR radiation.

Inkjet printing onto non-absorbant plastic substrates, such as transparencies, is known in the art, such as in U.S. Pat. No. 5,555,006.

KYNAR polyvinylidene coatings are formed onto flexible PVC by means of lamination of a pre-printed, pre-coated or clear PVDF flexible film.

There is a need for a better in-line method of forming a weatherable protective coating onto a rigid PVC or PO substrate.

Surprisingly it has been found that a weatherable protective coating can be formed onto a PVC or polyolefin extruded substrate by the in-line application of a polymeric solution or suspension by means of inkjet, brush-coat, roll-coat, gravure printing, flexographic printing, thermal transfer printing or spray application. A further advantage of inline coating application by any of these methods is that color designs are easily created and readily customized or adjusted or matched on the extruded PVC or polyolefin.

SUMMARY OF THE INVENTION

It is an object of the invention to provide an in-line process for applying a weatherable coating onto an extruded substrate such as PVC or a polyolefin.

It is a further object of the invention to provide a method for printing designs onto a PVC or polyolefin substrate and a protective coating in a one-step process.

Another object of the invention is to provide a means of applying a colored pattern and a weatherable coating onto a PVC or polyolefin substrate.

The objectives of the invention are achieved, in accordance with the principles of a preferred embodiment of the invention, by a process for forming a weatherable PVC or PO article comprising inline spray-coat, roll-coat, brush-coat, gravure print, flexographic print, thermal transfer print or inkjet application of a polymeric solution onto extruded PVC.

DETAILED DESCRIPTION OF THE INVENTION

The present invention relates to an in-line process for the formation of a weatherable extruded article by spray—coat, roll-coat, brush-coat, gravure print, flexographic print, thermal transfer print or inkjet application of a polymeric solution. PVC and polyolefin articles are preferred.

The PVC substrate is rigid polyvinyl chloride. The PVC may be any vinyl chloride polymer or copolymer composition, particularly one or more addition polymers chosen from the group formed by vinyl chloride homopolymers, which can optionally be overchlorinated, and the copolymers, optionally grafted, which result from the copolymerization of vinyl chloride with one or more ethylenically unsaturated comonomers.

Comonomers useful in the formation of a PVC copolymer include, but are not limited to, vinylidene halides such as vinylidene chloride or fluoride, vinyl carboxylates, such as vinyl acetate, vinylpropionate or vinyl butyrate, acrylic and methacrylic acids, and the nitriles, amides and alkylesters which derive therefrom, especially acrylonitrile, acrylamide, methacrylamide, methylmethacrylate, methyl acrylate, butyl acrylate ethyl acrylate. Or 2-ethylhexyl acrylate, vinyl aromatic derivatives, such as styrene or vinyl naphthalene, or olefins, such as bicycle[2.2.]hept-2-ene, ethylene, propene or 1-butene.

The generally preferred PVC polymers are the homo- and copolymers of vinyl chloride, having a K value of about 65.

Polyolefin substrates include useful in the invention include polyethylene, polypropylene, polybutylene, polyisoprene, their copolymers and mixtures thereof.

The polymeric solution for spray-coat, roll-coat, brush-coat, gravure print, flexographic print, thermal transfer print or inkjet application to the PVC or PO extruded substrate is a pigmented or non-pigmented, dye-containing or dye-free solvent or aqueous solution, dispersion, emulsion, or combination thereof of from 2 to 50 percent solids by weight, and preferably from 10 to 50% solids by weight.

The polymers useful in the solution, dispersion or emulsion used to form a coating on the PVC contain polymeric systems have weight average molecular weights greater than 100,000 and have glass transition temperatures of between −50° C. and +50° C. Polymers useful in the polymeric solution, dispersion or emulsion of the invention include, but are not limited to, acrylics, fluorinated polymers, urethanes, silicones, polysiloxanes, polyesters, epoxies, stabilized PVC and mixtures thereof in solution, dispersion or emulsion form.

In one preferred embodiment of the invention, the polymeric solution contains one or more fluoropolymers which are known for their excellent weatherability. These may be homopolymers, such as polyvilidene fluoride, or copolymers and terpolymers, such as, but not limited to, vinylidene fluoride/hexafluoropropylene copolymer, vinylidene fluoride/chlorotetrafluoroethylene copolymer, vinylidene fluoride/tetrafluoroethylene copolymer ethylene/tetrafluoroethylene copolymer, fluorinated ethylene propylene (FEP) and mixtures thereof. Fluoropolymers of the invention also include partially fluorinated polymers, such as ETFE and ECTFE, which may have similar decomposition products as fully fluorinated polymers.

Preferably the fluoropolymer is a polyvinylidene fluoride polymer. "PVDF" or PVDF resin or PVDF polymer refers not only to homopolymers of PVDF but also to copolymers prepared from at least about 75% by weight of vinylidene fluoride (VDF) monomer. Comonomers may include other fluorinated monomers such as: vinyl fluoride, hexafluoropropylene (HFP), chlorotetrafluoroethylene (CTFE), tetrafluoroethylene (TFE), and vinyl fluoride. Preferred are the homopolymers and the copolymers prepared from VDF and HFP to which small amounts (up to about 5 weight percent, preferably about 0.01 to about 0.05 weight percent) of PTFE may be added. PVDF coated PVC articles have improved gloss and color retention, as well as stain resistance.

The polymeric solution, dispersion, or emulsion for use in the application onto the PVC or polyolefin is formed by dissolving or dispersing the polymer in a solvent or aqueous media. Useful solvents include, but are not limited to, acetone, tetrahydrofuran, hexane, heptane, n-methyl pyrrolidone, methyl ethyl ketone, methyl acetate, ethyl acetate, cyclohexanone, isophorone, water, water with water-miscible solvents, and mixtures thereof. The coatings are applied at viscosities of 0.1 to 5000 cps, and preferably from 1-500 cps, when measured at room temperature. Those viscosities may be appreciably lower at the actual application temperature which will typically be between 50° C. and 125° C.

Other additives known in art may also be added to the polymeric coating solution or suspension including, but not limited to: dyes, colorants, impact modifiers, antioxidants, flame-retardants, ultraviolet stabilizers, flow aids, metal additives for electronic magnetic radiation shielding, defoamers and anti-static agents.

The polymeric solution may be applied to the extruded PVC at any point in the in-line process at temperatures ranging from 50° C. to 125° C.

In one embodiment of the invention, the inkjet, roll-coat, brush-coat, gravure print, flexographic print, thermal transfer coat or spray coating apparatus is placed immediately after the substrate extrusion, and before the embossing process. In another embodiment of the invention the inkjet, roll-coat, brush-coat, gravure print, flexographic print, thermal transfer coat or spray apparatus is placed in-line after the embossing operation. Following the embossing step, the coated PVC or polyoilefin substrate is generally cut, stamped and formed into a final article. Rigid PVC or polyolefin is especially useful for house siding, window frames, rain systems, soffits, trim, pipe, and panels. The coating will be applied at a dry film thickness of 0.02 mils to 4.0 mils with a preferred range of 0.02 to 1.2 mils. While the weatherable polymeric coating is generally applied only to one side of the PVC or polyolefin substrate, it is within the scope of the invention to apply the weatherable polymeric coating to both sides of the substrate. The double side coated substrate could have both sides coated with the same or different polymeric solution during the same coating cycle at the same coating station or at different stations.

The present invention saves production costs by providing a very thin film of the more expensive weatherable polymer on an inexpensive rigid PVC or polyolefin substrate. It also allows for production flexibility, in that the in-line application can occur anywhere in the production process. By requiring only one extruder, higher throughput is possible without the need to match the differential cooling rates of 2 extruders (one being the substrate, the other being the capstock).

Another aspect of the invention is the ability to provide a virtually endless spectrum of colors in the weatherable coating, ranging from a clear coating to black, and all colors in the visible spectrum limited only by the colorimetric capabilities of the colorants. Darker colors are easily achieved, as the films are thin compared to the current technology, and heat is quickly dissipated. Additionally, rapid color-to-color changeover is possible by simply changing the polymeric coating solutions or the ratios of in-line blended colored coatings. This saves both time and off-spec material involved in current processes. The use of four-color process printing, coating would allow for in-situ color matching and digital adjustment.

Custom Colors Would be Easily Achieved.

The ink-jet process would also allow for the printing of complex colored patterns such as faux-brick, faux stucco and other patterns onto the PVC or polyolefin substrate. With digital computer control, the range of possible patterns for applying to the exterior of a rigid substrate is as endless as one's imagination.

In one embodiment, a white coating is applied first to the rigid substrate, followed by the ink jetted coating. The effect of the inkjetted pattern is better distinguished on a white background. A white coating of an epoxy or PVDF is preferred.

In still another embodiment of the invention, the PVC or PO extruded substrate is coextruded with a capstock, followed by application of the weatherable coating.

EXAMPLES

Example 1

One would form a PVDF coating mixture by first making a 15% PVDF solution in Methyl Ethyl Ketone (solvent) and optionally adding colorant and/or additives. The PVDF coating is then placed into one or more reservoirs of an inkjet printer. The ink-jet printer is calibrated to print the precise pattern and polymer density onto PVC or polyolefin as it is extruded. The coated extruded PVC or polyolefin is then formed into a final article such as a sheet of vinyl siding, a window profile, a fence post, or other article.

Example 2

A PVDF coating mixture is prepared by first making a solution of PVDF at 10% solids in Acetone and n-methyl pyrrolidone. Optionally, pigments, dyes, additives or co-resins are also incorporated. This coating is then spray applied to extruded PVC or polyolefin either before or after the embossing step. The coated extrudate is then cut into planks from which vinyl decking is made.

Example 3

A white epoxy primer coating is applied inline to extruded PVC or polyolefin. It is subsequently overcoated by ink-jet process-printing a faux-brick design pattern. The coated PVC extrudate is then cut and shaped into vinyl siding panels.

What is claimed is:

1. A process for forming a weatherable polyvinyl chloride (PVC) or polyolefin (PO) article comprising applying a polymeric solution in-line onto extruded rigid PVC or PO to form a weatherable coating, wherein said coating comprises a fluorinated polymer as the coating-forming polymer, and wherein said weatherable coating is 0.02 to 4.0 mils thick, based on dry film thickness, wherein the polymeric solution is applied at a temperature of between 50° C. and 125° C. by inline spray, roll-coat, brush-coat, gravure print, flexographic print, thermal transfer coat, or inkjet application.

2. The process of claim 1 wherein said polymeric solution is colorant-containing or clear.

3. The process of claim 1 wherein said polymeric solution is a solvent-based solution or dispersion.

4. The process of claim 1 wherein said polymeric solution is an aqueous-based solution, dispersion or emulsion.

5. The process of claim 1 wherein said fluorinated polymer comprises a polyvinylidene homopolymer or co-polymer.

6. The process of claim 1 wherein said weatherable polymeric coating is 0.02 to 1.2 mils thick, based on dry film thickness.

7. The process of claim 1 further comprising the step of covering the PVC or PO substrate with a capstock or coating, prior to application of the weatherable coating.

* * * * *